United States Patent [19]

Zahir et al.

[11] 4,130,600

[45] Dec. 19, 1978

[54] EPOXIDE RESIN MIXTURES

[75] Inventors: Abdul-Cader Zahir, Oberwil; Siegfried Wyler, Dornach, both of Switzerland

[73] Assignee: Ciba-Geigy Corporation, Ardsley, N.Y.

[21] Appl. No.: 803,497

[22] Filed: Jun. 6, 1977

[30] Foreign Application Priority Data

Jun. 17, 1976 [CH] Switzerland .................. 7747/76

[51] Int. Cl.$^2$ .................................................. C08L 63/00
[52] U.S. Cl. .............................. 260/830 P; 260/837 R; 428/415; 428/416
[58] Field of Search .................. 260/830 P, 837 R

[56] References Cited

U.S. PATENT DOCUMENTS

| 3,429,947 | 2/1969 | Eygen ............................. | 260/837 R |
| 3,730,948 | 5/1973 | Akiyama ......................... | 260/830 P |
| 3,839,493 | 10/1974 | Balme ............................. | 260/830 P |
| 3,875,113 | 4/1975 | Lefebvre ......................... | 260/830 P |
| 3,880,811 | 4/1975 | Kaupp ............................. | 260/830 P |
| 3,883,486 | 5/1975 | Bargain ........................... | 260/837 R |
| 3,920,768 | 11/1975 | Kwiatowski ................... | 260/837 R |
| 3,962,182 | 6/1976 | Steele .............................. | 260/47 EN |
| 3,978,152 | 8/1976 | Gruffaz ........................... | 260/830 P |
| 3,985,928 | 10/1976 | Watanabe ...................... | 260/830 P |
| 4,005,154 | 1/1977 | Bargain ........................... | 260/837 R |

FOREIGN PATENT DOCUMENTS

50-78697  6/1975  Japan .................................... 260/830 P

*Primary Examiner*—Paul Lieberman
*Attorney, Agent, or Firm*—Joseph F. DiPrima; Vincent J. Cavalieri

[57] ABSTRACT

The invention relates to storage-stable, thermosetting mixtures which contain polymaleimides, epoxide compounds having at least one allyl group, and optionally, curing agents for epoxide compounds, and/or curing accelerators for epoxide resin mixtures. These mixtures can be converted by curing into high-polymers which have excellent electrical properties (especially at high temperatures) and very good thermal properties.

13 Claims, No Drawings

EPOXIDE RESIN MIXTURES

Attempts have already been made to improve the electrical properties, the stability to heat and also the chemical inertia at elevated temperatures of conventional epoxide resins by the combination of epoxide resins or epoxide resin mixtures with maleimide derivatives. Reference is made in this respect, for example, to German Auslegeschrift No. 2,123,638 and to German Offenlegungsschrift No. 2,230,904. According to the first-mentioned publication, there is claimed a solution of a bisphenol-A epoxide resin and an organic acid anhydride in a maleimide compound, which solution after curing yields the improved materials. German Offenlegungsschrift No. 2,230,904 claims on the other hand thermosetting compositions comprising the reaction product of an epoxide resin with a prepolymer containing maleimide groups, which prepolymer is formed from a bis-maleimide and an aromatic-aliphatic polyamine; and these compositions are likewise said to yield improved polymers.

The properties of the polymers obtained by the curing of the epoxide resin mixtures according to the stated prior art are however still not sufficiently good for many special applications in the electrical field.

The object of the present invention is to produce mixtures containing epoxide resins and maleimides, which mixtures can be converted by a curing reaction into polymers having electrical properties (particularly at high temperatures) and thermal properties which in both cases are better than those of the known polymers of similar type.

The invention relates to storage-stable, thermosetting mixtures which comprise
(a) polyimides containing in the molecule at least twice a radical of the general formula

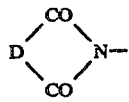

(I)

wherein D represents a bivalent radical containing a carbon-carbon double bond;
(b) epoxide compounds containing at least one allyl group; and, optionally,
(c) curing agents for epoxide compounds; and/or
(d) curing accelerators for epoxide resin mixtures.

The mixtures according to the invention contain as epoxide compound (b) preferably an epoxide compound, or a mixture of several epoxide compounds, from the series:
(α) glycidyl ethers of the formula

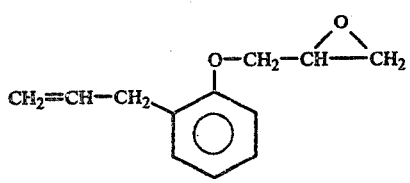

(II)

(β) glycidyl ethers of novolaks (X) containing on at least one aromatic nucleus at least one allyl group;
(γ) polyepoxy adducts (Y) which have been produced by an advancement reaction of one or more diepoxide compounds with one or more bisphenols, whereby at least one reactant contains one or more allyl groups on at least one aromatic nucleus; and
(δ) epoxide compounds (Z) which have been produced by reaction of bisphenols, containing one or more allyl groups on at least one aromatic nucleus, with epichlorohydrin in alkaline solution.

The mixtures according to the invention contain the constituents preferably in such a ratio that to 1 equivalent of polyimide there are 0.05 to 10, preferably 0.1 to 1.5, equivalents of epoxide, optionally 0.05 to 10, preferably 0.05 to 2, mols of curing agent and optionally 0.01 to 5, preferably 0.01 to 3, % by weight (relative to the polyimide) of curing accelerator.

Most of the imides usable according to the invention are described in detail in the literature. They can be produced, using the methods described in the U.S. Pat. spec. No. 3,010,290 and in the GB Pat. specification No. 1,137,592, by reaction of the corresponding diamines with the unsaturated dicarboxylic acid anhydrides.

The mixtures according to the invention can contain all the polyimides which have been already listed in the French Pat. No. 1,555,564. Particularly well suited are the maleimides containing the radical of the formula I, in which D represents the bivalent radical of the formula

(VI)

wherein R represents hydrogen or methyl.

A preferred embodiment of the invention comprises mixtures with polyimides containing the radical of the formula (I) two or three times in the molecule, and hence comprises solutions containing in particular bis- and tris-maleimides.

To be mentioned as bis-maleimides which are particularly well suited are compounds of the formula

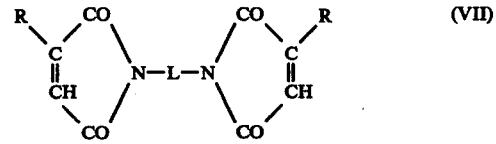

(VII)

wherein L represents a bivalent organic radical having 2 to 30 C atoms.

The radical L in the formula VII corresponds preferably to the formula

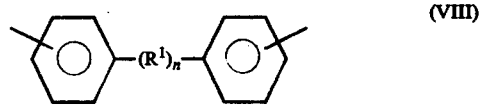 (VIII)

wherein $R^1$ represents one of the radicals —$CH_2$—,

—$SO_2$—, —SO—, —S— and —O—, and n represents 0 or 1.

The following substances may be mentioned as examples of known polyimides which are suitable for the mixtures according to the invention: N,N'-hexamethylene-bis-maleimide, N,N'-p-phenylene-bis-maleimide, N,N'-4,4'-diphenylmethane-bis-maleimide, N,N'-4,4'-3,3'-dichlorodiphenylmethane-bis-maleimide, N,N'-4,4'-diphenyl ether-bis-maleimide, N,N'-4,4'-diphenylsulphone-bis-maleimide, the N,N'-bis-maleimide of 4,4'-diamino-triphenyl phosphate, the N,N'-bis-maleimide of 4,4'-diamino-triphenyl thiophosphate, the N,N',N''-tris-maleimide of tris-(4-aminophenyl) phosphate and the N,N',N''-tris-maleimide of tris-(4-aminophenyl) thiophosphate.

Also mixtures of two or more of all the above-mentioned polyimides can be used for the mixtures according to the invention.

The glycidyl ethers of novolaks (X) usable in the mixtures according to the invention correspond exactly to those described in the "Handbook of Epoxy Resins" by Henry Lee and Kris Neville (Mc Graw-Hill Book Corp., USA 1967) under 2-10 to 12, except that those according to the invention contain one or more allyl groups on the aromatic nuclei. In producing the novolaks, which are glycidylised, allylphenols are used either partially or entirely.

The epoxide compounds (Z) usable according to the invention correspond generally to the standard epoxide resins from polyphenols and epichlorohydrin, as are discussed in the above-mentioned Handbook under 2-2 (see also Houben-Weyl "Methoden der Organischen Chemie" (Methods in Organic Chemistry), Stuttgart 1963, Volume 14, 2nd part, pp. 468–470), the only difference being that those according to the invention can also contain, as in the case of the above novolak epoxide resins, one or more allyl groups on aromatic nuclei. In the production of these epoxide compounds (Z), the following bisphenols can be reacted with epichlorohydrin in alkaline solution:

o,o'-diallyl-bisphenol-A and
o,o'-diallyl-bisphenol-F.

Optionally, it is possible to add to the mixture also bisphenols containing no allyl groups. Concerning this type of epoxide compounds, a detailed account has been given by H. Batzer and S. A. Zahir in the "Journal of Applied Polymer Science," 19 (1975) 585–600. The production process is designated therein as the "Taffy" process.

In this last-mentioned publication and also in the "Kunststoff-Rundschau" (Plastics Review), No. 1, January 1959, pp. 6 to 10 (by M. Lidarik), there is mention also of polyepoxy adducts which are obtained by an advancement reaction of diepoxide compounds with bisphenols. By the same process, though with the use or concomitant use of starting products containing allyl groups on aromatic nuclei, there are also obtained the polyepoxy adducts (Y), which the mixtures according to the invention can contain. Preferably, these contain those polyepoxy adducts which have been produced by an advancement reaction of a diglycidyl ether of the formula

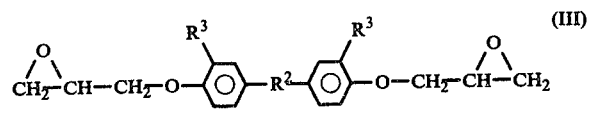

wherein $R^2$ represents one of the radicals —CH$_2$— and

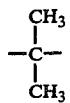

and $R^3$ represents the allyl group or H, with one or more of the bisphenols of the formula

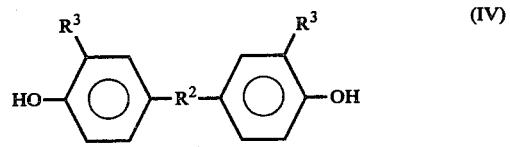

and

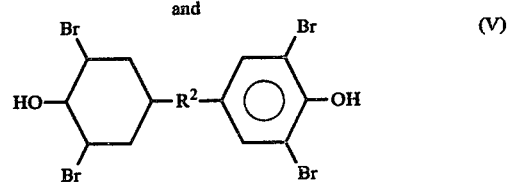

whereby at least one starting substance contains at least one allyl group on the aromatic nucleus.

The mixtures according to the invention can contain, besides the epoxide compounds containing allyl groups, additionally also epoxide compounds free from allyl groups. Suitable such products are, for example, customary bisphenol-A epoxide resins or bisphenol-F epoxide resins and triglycidylisocyanurate, epoxide compounds containing hydantoin nuclei and so forth.

The mixtures according to the invention can contain as curing agents for epoxide compounds, e.g., polycarboxylic acids and anhydrides thereof and compounds having amino groups. There are preferably used the anhydrides of organic acids, especially phthalic acid anhydride, and aliphatic or aromatic or mixed aromatic-aliphatic amines, particularly 4,4'-diaminodiphenylmethane and dicyandiamide.

To be mentioned as curing accelerators for epoxide resin mixtures, which are used for the mixtures according to the invention, are tertiary amines, especially benzyldimethylamine and imidazole, and catalysts forming radicals, particularly organic peroxides and azobisisobutyronitrile.

With the realisation of the object of this invention, it had to be surprising that the mixtures according to the invention led to such a high dimensional stability of the polymers at high temperatures. That was indeed not to be expected in view of the high proportion of epoxide compounds. It was also surprising that the allyl groups, which effect an interrupting chain transfer reaction (degradation chain transfer), did not have a negative effect on the curing and finally on the physical properties of the polymers.

The invention also relates to a process for producing crosslinked polymers containing imide groups by curing of the mixtures according to the invention.

The corresponding reaction is performed preferably in the melt or partly in the melt and partly in the solid phase. It can however also be performed, in particular, partially in solution. In most cases, however, an addition of solvents is not necessary because the starting mixtures as such are sufficiently fluid at medium temperatures (e.g. at 120° C.). If the process is carried out in the melt, temperatures of 100° to 250° C. are particularly well suited. The curing time is 12 to 30 hours; it is however clearly dependent on the curing temperature.

The process for producing the polymers by application of the mixtures according to the invention is also particularly well suited for producing copper-laminated laminates, which are used in particular for printed circuits. There are preferably employed for this purpose impregnating solutions containing the mixtures according to the invention.

The following substances are to be mentioned as suitable solvents: chloroform, dioxane, tetrahydrofuran, dimethylformamide, tetramethylurea, N-methylpyrrolidone, 2-methoxyethanol and methyl ethyl ketone.

The processing of the mixtures according to the invention can be carried out, in the following manner, also in two stages. After mixing and, optionally, after subsequent grinding of all the starting products, the powder or the liquid is firstly heated for a limited time preferably at 120°–170° C.; there is thus formed a still thermoplastic, partially soluble product. This prepolymer has, if necessary, to be ground again into the form of a workable powder before being ultimately cured in final processing. The prepolymerisation can also be effected by heating a solution or suspension of the starting materials.

The cross-linked polymers containing imide groups are produced according to the invention as a rule with simultaneous shaping into moulded articles, sheet materials, laminates, bonds or foam plastics. In the process, there can be added to the curable compounds the additives customary in the technology of curable plastics, such as fillers, plasticisers, pigments, dyes, mould lubricants or flame-retarding substances. The fillers used can be, for example, glass fibres, carbon fibres, mica, graphite, quartz powder, kaolin, colloidal silicon dioxide or metal powders; the internal mould lubricants can be, for example, silicon oil, various waxes, zinc stearate or calcium stearate, etc.

The shaping of the products obtainable by the process according to the invention can be effected in the most simple manner by the casting process using a casting mould.

Shaping can also be performed however by the hot compression moulding process using a press. It is sufficient in most cases to heat briefly at temperatures of 170° to 250° C. at a pressure of 1 to 200 kp/cm$^2$, and to completely cure the resulting moulded article outside the press.

The mixtures according to the invention and the polymers obtainable by the use thereof are applicable, in particular, in the fields of casting production, surface protection, electrical engineering, lamination processes, adhesives and foam plastics and in the building industry.

Production of starting products for the process according to the invention

I. Diglycidyl ether of o,o'-diallyl-bisphenol-A (Z 1)

Bisphenol-A (228 g), NaOH (82.5 g) and n-propanol (1 liter) are refluxed. After everything is dissolved, 200 ml of allyl chloride is slowly added. The mixture is practically neutral after three hours and is refluxed after a further three hours. After cooling to room temperature, the precipitated NaCl is filtered off and the n-propanol is distilled off. The resulting crude diallyl ether of bisphenol-A (308 g) is taken up in methylene chloride and washed with water. After separation of the aqueous phase, the methylene chloride is again distilled off. The resulting pure diallyl ether of bisphenol-A is dried over sodium sulphate.

The diallyl ether of bisphenol-A is subjected to a Claisen rearrangement at 200° C. to 205° C. into o,o'-diallyl-bisphenol-A using the monoether of diethylene glycol as solvent (about 50% solution). The product is afterwards purified by means of a rotary evaporator and subsequently by vacuum distillation (b.p. 190° C./0.5 mm/Hg). The yield of o,o'-diallyl-bisphenol-A is 85%. Both the structure of the intermediate and that of the final product is verified by means of microanalysis, gas chromotography, gel-permeation chromatography and NMR- and IR-spectroscopy.

The o,o'-diallyl-bisphenol-A obtained is then converted in a known manner, by addition of epichlorohydrin and subsequent dehydrohalogenation, into the diglycidyl compound (Z 1). The product contains 4.71 epoxide equivalents and 4.5 equivalents of allyl double bonds per kg.

II. Advancement product ($Y_1$)

1019 g of a liquid diglycidyl ether of bisphenol-A (5.15 epoxide equivalents/kg) is reacted, in the presence of 5 mg of 2-phenylimidazole, with 382.7 g of o,o'-diallyl-bisphenol-A in the melt at 185° C. under nitrogen. There has formed after 2½ hours a solid advancement product ($Y_1$) which has an epoxide content of 2.02 equivalents/kg and contains 1.77 equivalents of allyl double bonds/kg.

WORKING EXAMPLES (A) Casting resins (a) Production of castings according to the Examples 1 to 6

The amounts, required for the respective test, of polymaleimide, epoxide compound and, optionally, curing agent for this epoxide compound are placed into a round flask. After connection to a rotary evaporator, the temperature is raised to 120° C. to 150° C. by means of an oil bath. A melt is formed and into this is optionally introduced the specifically required amount of curing accelerator or curing catalyst. The melt is subsequently degassed under vacuum (15 mm Hg); air is then admitted and the melt is poured into moulds preheated to 150° C. According to Examples 1 to 4, the mixture is heated in an oven firstly for 3 hours at 120° C., then for 3 hours at 200° C. and finally for 12 hours at 250° C. In Example 5, however, the procedure followed is that according to German Auslegeschrift No. 2,123,638 (Example 1), i.e. curing is effected by 8 minutes heating at 150° C. Excellent castings are obtained after slow cooling of the respective mould. In Table 1 are given the starting products and the respective amounts thereof used in the individual Examples.

The Examples 1, 3 and 6 illustrate the process according to the invention; the Examples 2, 4 and 5 however are Comparative Examples. The physical, mechanical and electrical properties are summarized in Table 2.

(b) Mechanical and physical properties of the polymers

The test values of the polymers produced according to (a) are summarized in Table 2. There are in each case three results: namely a test value obtained on the unaged product; a further test value obtained on a specimem heated for 10 hours at 200° C.; and a test value obtained on a specimem heated for 10 hours at 270° C. (By way of exception, ageing was performed in Example 5 for 12.5 days at 250° C.) The following test methods are applied:

| | |
|---|---|
| dimensional stability under heat: | ISO/R-75* |
| flexural strength and modulus of elasticity | VSM 77 103** |
| dielectric loss factor tan δ | effective voltage 1000 V *DIN 53 483* |
| dielectric constant ε | 100 pf |
| specific resistance: | $C_n$ DIN 53 482 |

*ISO/R = standards of the International Standard Organisation/Recommendation
**VSM = standards of the "Verein Schweizerischer Maschinenindustrieller" (Association of Swiss Engineering Industrialists)

Loss of weight at 200° C. and at 270° C.

A specimem of dimensions 60 × 10 × 4 mm is stored for 10 days at 200° C. in a drying cabinet and the loss of weight of the specimen is afterwards determined. An analogous test is performed on a new specimen of the same dimensions after storage at 270° C.

(B) Impregnating resins (a) Production of the impregnating solutions

The N,N'-4,4'-diphenylmethane-bis-maleimide and the respective diglycidyl compound are dissolved in furfuryl alcohol and methyl glycol at 140° C. and then cooled to room temperature.

Diaminodiphenylmethane or dicyandiamide is dissolved in the residual methyl glycol at 100° C., and the solution obtained is cooled. The two solutions are combined and afterwards the peroxide used as accelerator is added. The desired impregnating viscosity is adjusted to 200–400 cP/25° C. by the addition of a small amount of methyl glycol.

The starting products and the respective amounts thereof used in the Examples are likewise summarized in Table 1. The Examples 7 to 9 are examples according to the invention; Examples 10 to 12, however, are comparative examples.

(b) Production of laminated plastics

The reactive solution thus obtained is used in each case to impregnate a glass fabric having a weight per square meter of 200 g and plain weave, which contains as adhesion promoter γ-glycidoxypropyl-trimethoxy-silane of the formula

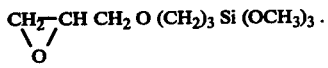

The glass fabric is impregnated in the immersion process at 25° C., and subsequently dried in an air-circulation oven at 150° C. Eight layers of the impregnated fabric are then compressed hot between two 35 micron thick copper sheets which have been pretreated by means of surface electrolytic brass coating. The press is firstly held for 2 minutes under a slight contact pressure and the pressure is afterwards raised to 30 kp/cm³. The preliminary reaction can be rendered unnecessary by a correspondingly longer contact time in the press. The test specimen is removed from the press after 1 hour and is aftercured for a further 6 hours in an oven at 200° C.

(c) Mechanical and physical properties of the laminates

Results obtained from tests on the prepegs and details concerning production of the laminates according to Examples 7 to 12 and concerning the values resulting from the mechanical and physical testing of the laminates thus obtained are summarised in Table 3. The following test methods are applied in the tests:

flexural strength in N/mm² (according to ISO/R 178);

impact bend strength in Ncm/mm² (according to VSM 77 105);

shear strength (according to ASTM D 2344);

copper adhesion, measured at 25° C. and at 150° C. according to NEMA LI 1-1971 (U.S. standard specification of the National Electrical Manufactures Association);

water absorption in % by weight after 24 hours at 23° C. and after 6 hours at 100° C.; the measurements are made on bending-test specimens of the VSM standard 77 103 [VSM is the abbreviation for Verein Schweizerischer Maschinenindustrieller (Association of Swiss Engineering Industrialists)];

dielectric loss factor (tan δ/50 c.p.s.), measured according to DIN 53 483: determination of the temperatures at which tan δ is 0.01 and 0.03;

dielectric constant (ε/50 c.p.s.), measured at 23° C. and at 200° C. according to DIN 53 483.

Abbreviations

The following abbreviations are used in the Tables:
BMDM for 4,4'-bismaleimidodiphenylmethane,
HHPA for hexahydrophthalic acid hydride,
MTHPA for methyltetrahydrophthalic acid anhydride,
DDM for diaminodiphenylmethane,
TBP for di-tert.-butyl peroxide,
BDMA for benzyldimethylamine,
DCP for di-cumyl peroxide.

Table 1

| Example No. | Employed Polyimide Type | Amount g | Mol | Employed epoxide compound Type | Amount g | Employed curing agent Type | Amount g | Mol | Employed curing accelerator Type | ml | % by weight | Furfuryl alcohol Amount g | Glykolmono-methyl ether Amount g |
|---|---|---|---|---|---|---|---|---|---|---|---|---|---|
| 1 | BMDM | 44.75 | 0.125 | $Z_1$ | 210.3 | HHPA | 115.6 | 0.75 | TBP and BDMA | 1 2 | | | |
| 2 | BMDM | 44.75 | 0.125 | bisphenol-A type (5.15 epoxide equivalents/kg) | 194 | HHPA | 115.6 | 0.75 | TBP and BDMA | 1 2 | | | |
| 3 | BMDM | 100 | | $Z_1$ | 71.1 | HHPA | 41.5 | | BDMA | 1 | | | |
| 4 and 5 | BMDM | 100 | | bisphenol-A type (5.72 epoxide equivalents/ | 58.5 | HHPA | 41.5 | | BDMA | 1 | | | |

Table 1-continued

| Example No. | Employed Polyimide Type | Amount g | Mol | Employed epoxide compound Type | Amount g | Employed curing agent Type | Amount g | Mol | Employed curing accelerator Type | Amount ml | % by weight | Furfuryl alcohol Amount g | Glykolmonomethyl ether Amount g |
|---|---|---|---|---|---|---|---|---|---|---|---|---|---|
| 6 | BMDM | 358 | 1 | $Z_1$ (kg) | 315 | — | — | | — | — | | — | — |
| 7 | BMDM | 563 | | $Z_1$ | 500 | DDM | 122 | | DCP | 5 | (95%) | 100 | 500 |
| 8 | BMDM | 563 | | $Z_1$ | 500 | MTHPA | 400 | | DCP | 5 | (95%) | 100 | 200 |
| 9 | BMDM | 110 | | $Y_1$ | 480 | dicyandiamide | 16.7 | | DCP | 5 | (95%) | 25 | 315 |
| 10 | BMDM | 563 | | bisphenol-A type (5.2 epoxide equivalents/kg) | 500 | DDM | 135 | | DCP | 5 | (95%) | 100 | 500 |
| 11 | BMDM | 563 | | bisphenol-A type (5.2 epoxide equivalents/kg) | 500 | MTHPA | 442 | | DCP | 5 | (95%) | 100 | 500 |
| 12 | BMDM | 110 | | bisphenol-A type (2.1 epoxide equivalents/kg) | 480 | dicyandiamid | 16.7 | | DCP | 5 | (95%) | 25 | 315 |

Table 2

| Ex. No. | Ageing | Loss in weight on ageing % by weight | Dimensional stability under heat °C | Change in length % | Change in width % | Modulus of elasticity N/mm² | Flexural strength M/mm² | The dielectric loss factor tan δ is 0.01 at | 0.03 at | Dielectric loss factor tan δ 10² at 200° C | at 250° C | Dielectric constant ε at 200° C | Specific resistance Ω 10⁻¹² |
|---|---|---|---|---|---|---|---|---|---|---|---|---|---|
| 1 | unaged | — | — | — | — | 2811.5 | 104.9 | 188° C | 220° C | — | — | 3.8 | 1.3 |
| | 10 days 200° C | 1.17 | 263 | 0.08 | 0.75 | 2978.2 | 100.5 | — | — | — | — | — | — |
| | 10 days 270° C | 8.15 | — | 1.86 | 2.04 | 3114.9 | 65.3 | 142° C | 212° C | — | — | 3.7 | 2.7 |
| 2 | unaged | — | — | — | — | 2756.0 | 138.6 | 123° C | 140° C | — | — | 5.1 | 0.18 |
| | 10 days 200° C | 6.10 | 142 | 0.05 | 5.58 | 2743.5 | 118.3 | — | — | — | — | — | — |
| | 10 days 270° C | 9.45 | — | 0.80 | 3.49 | 3236.1 | 62.9 | 127° C | 160° C | — | — | 4.3 | 1.7 |
| 3 | unaged | — | — | — | — | 2761 | 100.0 | — | — | 0.5 | 0.85 | 3.5 | 59 |
| | 10 days 200° C | 1.22 | >300 | 0.21 | 0.63 | 2891 | 90.6 | — | — | — | — | — | — |
| | 10 days 270° C | 6.81 | 299 | 1.68 | 1.92 | 3222 | 109.0 | — | — | 0.7 | 5.25 | 3.3 | — |
| 4 | unaged | — | — | — | — | 2952 | 99.0 | — | — | 0.75 | 1.90 | 6.2 | 105 |
| | 10 days 200° C | 1.40 | 287 | 0.26 | 0.65 | 2982 | 110.0 | — | — | — | — | — | — |
| | 10 days 270° C | 9.85 | 239 | 3.23 | 3.17 | 3465 | 110.0 | — | — | 0.75 | 6.29 | 5.8 | — |
| 5 | unaged | — | — | — | — | — | — | — | — | — | — | — | 0.6 |
| | 12.5 days 250° C | 9.5 | — | — | — | — | 83.78 | — | — | 5.4 | — | — | — |
| 6 | unaged | 0 | >300 | — | — | — | 83.78 | — | — | — | — | 3.6 (at 250° C) | 3.0 |
| | 10 days 200° C | — | — | — | — | — | — | — | — | — | — | — | — |
| | 10 days 270° C | 10.0 | >300 | — | — | — | 92.80 | — | — | — | — | — | — |

Table 3

| Example No. | Dimension | 7 | 8 | 9 | 10 | 11 | 12 |
|---|---|---|---|---|---|---|---|
| gelling time at 150° C | min. | 32 | 3 | 23 | 17 | 11 | 18 |
| drying time at 150° C | min. | 30 | 10 | 22 | 16 | 25 | 26 |
| appearance of the prepeg | | l'brown dry | l'yellow dry | l'yellow dry | d'brown dry | l'yellow dry | d'brown dry |
| resin content of the prepeg | % | 36 | 36 | 43 | 36 | 35 | 45 |
| curing time in the press | h | 1 | 1 | 1 | 1 | 1 | 1 |
| press temperature | °C | 180 | 180 | 180 | 180 | 180 | 180 |
| resin content of the laminate | % | 34 | 35 | 40 | 35 | 34 | 42 |
| aftercuring of the laminate | h/°C | 6/200 | 6/200 | 6/200 | 6/200 | 6/200 | 6/200 |
| copper adhesion of the laminate | | | | | | | |
| - at 25° C | kg/inch | 3.2 | 2.4 | 4.8 | 3.4 | — | 4.6 |
| - at 150° C | kg/inch | 2.0 | 1.4 | 1.8 | 2.0 | — | 1.6 |
| flexural strength* | | | | | | | |
| - initial value* | N/mm² | 476 | 430 | 486 | 469 | 278 | 446 |
| - after 4h in boiling water* | N/mm² | 438 | 389 | 442 | 411 | 249 | 386 |
| impact bend strength | Ncm/mm² | 6.70 | 7.68 | 8.39 | 7.55 | 5.11 | 7.49 |
| boiling-water absorption after 4h* | % | 0.27 | 0.47 | 0.48 | 0.32 | 1.07 | 0.52 |
| cold-water absorption after 24h/23° C | % | 0.13 | 0.25 | 0.10 | 0.14 | 0.30 | 0.11 |
| shear test according to ASTM | n/mm² | 26.8 | 15.2 | 34.6 | 39.6 | 15.0 | 34.7 |
| dielectric loss factor tan δ at elevated temperature | | | | | | | |
| 0.01 obtained at | °C | 217 | 190 | 95 | 176 | 70 | 82 |
| 0.03 obtained at | °C | 246 | 243 | 127 | 192 | 147 | 102 |

Table 3-continued

| Example No. | Dimension | 7 | 8 | 9 | 10 | 11 | 12 |
|---|---|---|---|---|---|---|---|
| dielected constant |  |  |  |  |  |  |  |
| ε at elevated temperature |  |  |  |  |  |  |  |
| - measured at 23° C |  | 5.0 | 5.2 | 5.1 | 5.1 | 5.6 | 4.7 |
| - measured at 200° C |  | 5.0 | 5.5 | — | 5.5 | 6.1 | — |

What is claimed is:

1. A storage-stable, thermosetting mixture which comprises:
   (a) a polyimide containing in the molecule at least two radicals of the general formula

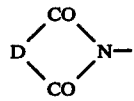  (I)

wherein d represents a bivalent radical containing a carbon-carbon double bond;
   (b) 0.05 to 10 moles per equivalent of polyimide of an epoxide compound which contains at least one allyl group selected from the group consisting of
   (α) glycidyl ethers of the formula

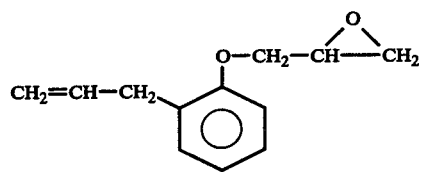  (II)

(β) glycidyl ethers of novolaks (x) which contain two or more epoxide groups per molecule and are substituted on an aromatic nuclei with at least one allyl group,
   (γ) polyepoxy adducts (Y), having two or more epoxy groups per molecule, produced by an advancement reaction of one or more diepoxide compounds with one or more bisphenols, where at least one reactant is substituted on an aromatic nuclei with at least one allyl group,
   (δ) epoxide compounds (Z) produced by the reaction of bisphenols, which are substituted on an aromatic nuclei with at least one allyl group, with epichlorohydrin in alkaline solution;
   (c) up to 2 moles of a curing agent for epoxide compounds per equivalent of polyimide; and,
   (d) up to 3 percent by weight, relative to the polyimide, of a curing accelerator for epoxide resins.

2. A mixture according to claim 1, which contain as polyepoxy adducts (Y) such products which have been produced by an advancement reaction of a diglycidyl ether of the formula

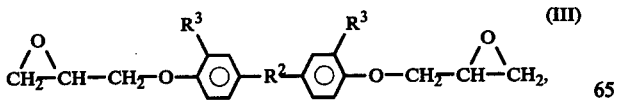  (III)

wherein $R^2$ represents one of the radicals —$CH_2$— and

and $R^3$ represents the allyl group or H, with one or more of the bisphenols of the formulae

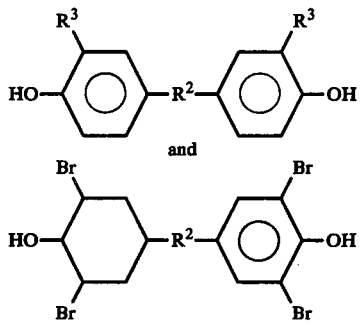

(IV)

and (V).

3. A mixture according to claim 1, which contain polyimides having radicals of the formula (I) in which D represents a bivalent radical of the formula

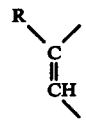  (VI)

wherein R represents hydrogen or methyl.

4. A mixture according to claim 1, which contain polyimides having the radical of the formula (I) two or three times in the molecule.

5. A mixture according to claim 2, which contain as polyimide a compound of the general formula

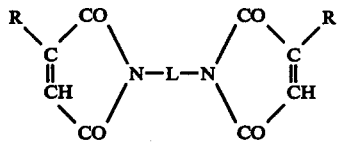  (VII)

wherein L represents a bivalent organic radical having 2 to 30 C atoms.

6. A mixture according to claim 5, which contain as polyimide a compound of the formula (VII) in which L represents a radical of the formula

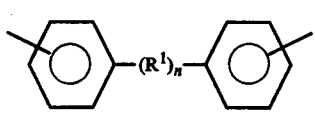  (VIII)

wherein $R^1$ represents one of the radicals —$CH_2$—,

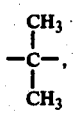

—SO$_2$—, —SO—, —S— and —O—, and n represents 0 or 1.

7. A mixture according to claim 5, which contain as polyimide 4,4'-bis-maleimidodiphenylmethane.

8. A mixture according to claim 1, which additionally contain monoimides, preferably monomaleimides, containing the radical of the formula I.

9. A mixture according to claim 1, which contain as curing agents for epoxide compounds anhydrides of organic acids, or aliphatic or aromatic or mixed aromatic-aliphatic amines.

10. A mixture according to claim 9, which contain as curing agents for epoxide compounds a compound from the group: phthalic acid anhydride, 4,4'-diaminodiphenylmethane and dicyandiamide.

11. A mixture according to claim 1, which contain as curing accelerator for epoxide resin mixtures benzyldimethylamine or imidazole, or catalysts forming radicals, preferably organic peroxides or azo-bis-isobutyronitrile.

12. A mixture according to claim 1 which contain, besides epoxide compounds containing allyl groups, additionally epoxide compounds containing no allyl groups.

13. Process for producing cross-linked polymers containing imide groups, which process comprises bringing to reaction and a curing mixture according to claim 1 at temperatures of 25° to 250° C., preferably 100° to 250° C., whereby an initial part of the reaction can be performed in solution.

* * * * *